Feb. 27, 1951            D. C. BRITTON            2,543,349
COMBINATION HOUSING AND BOAT CARRYING TRAILER
Filed July 7, 1949            2 Sheets-Sheet 2
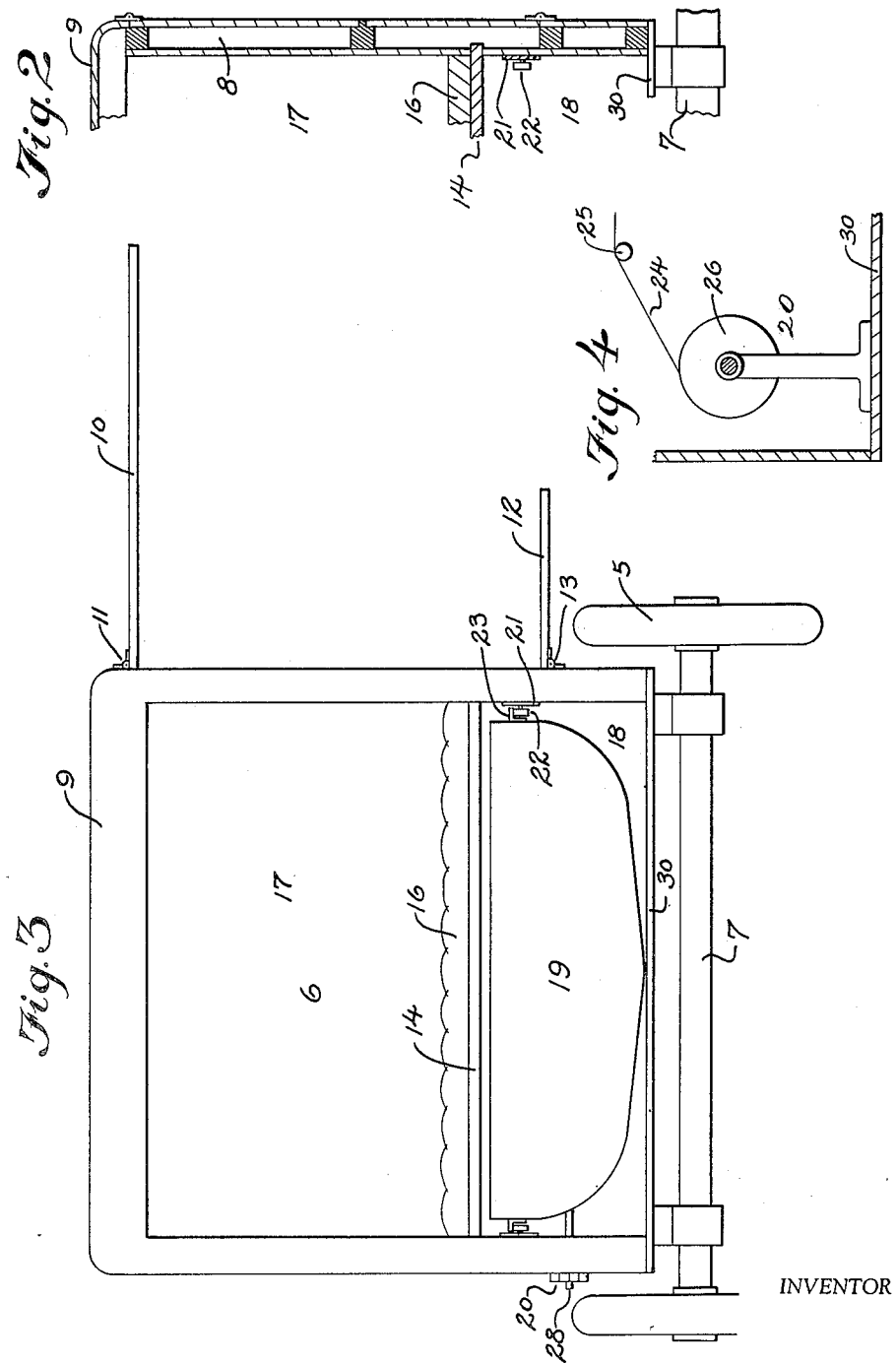
INVENTOR
Dempsy C. Britton
BY Shepherd & Campbell
ATTORNEYS Patented Feb. 27, 1951

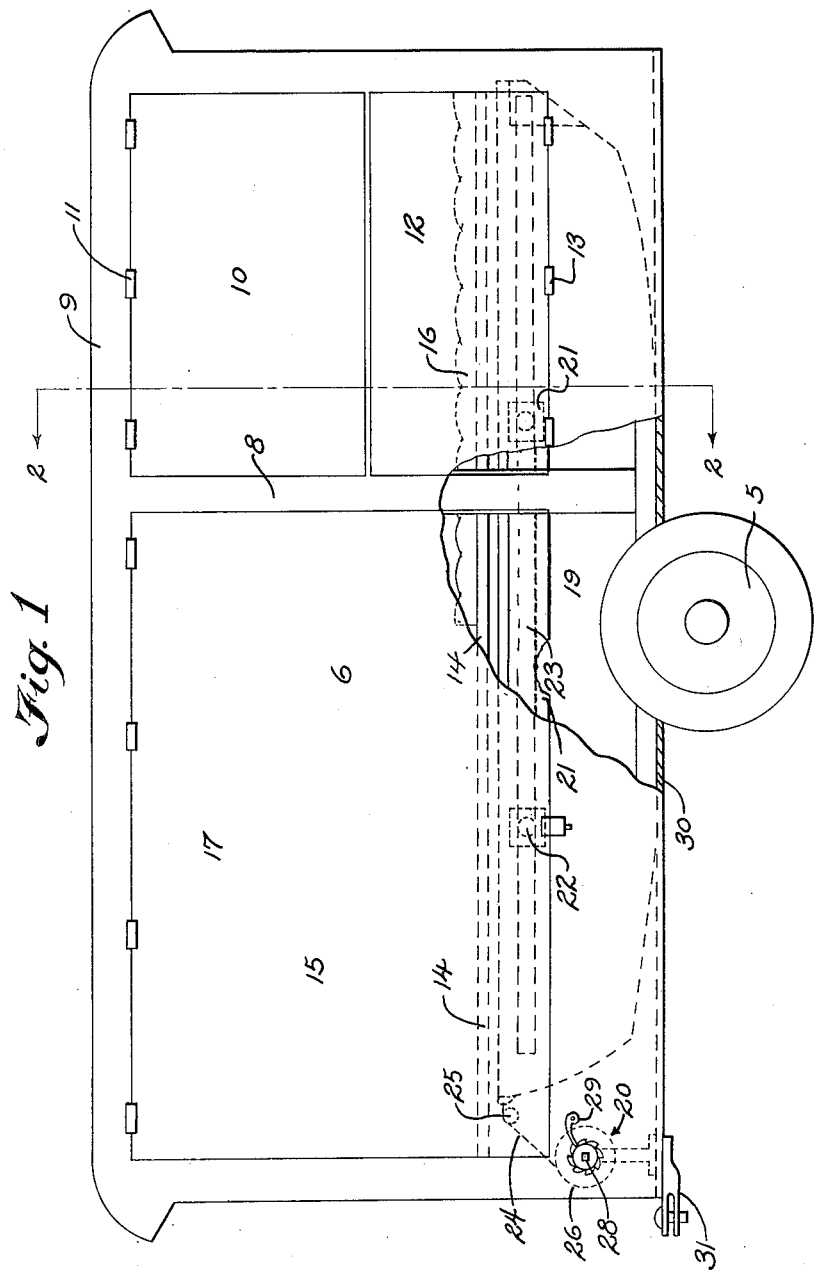

2,543,349

UNITED STATES PATENT OFFICE 2,543,349

COMBINATION HOUSING AND BOAT CARRYING TRAILER

Dempsey C. Britton, Cold Spring, Ky.

Application July 7, 1949, Serial No. 103,506

1 Claim. (Cl. 214—65)

This invention relates to a sportsman's trailer. It is so called because it embodies in a single wheeled vehicle of the trailer type means for housing the occupant and for transporting a boat, so that the user may upon reaching a lake or river set up housekeeping upon the shore and enjoy the sports of boating and fishing.

The primary object of the invention is to provide a vehicle of the trailer type, adapted to be towed by an automobile and having its body space divided by a horizontal floor into an upper or housing part and a lower or boat receiving, transporting and housing compartment.

It is a further object of the invention to mount the body of the structure on its pair of supporting wheels in such manner that the boat will be so balanced that one man, without undue exertion, may launch the boat and, after use, reload said boat into the boat receiving compartment.

The invention will be best understood after a consideration of the accompanying drawings wherein:

Fig. 1 is a view partly in side elevation and partly in section, with parts broken away;

Fig. 2 is a fragmentary transverse section on line 2—2 of Fig. 1;

Fig. 3 is a rear elevation; and

Fig. 4 is a fragmentary longitudinal section through the winch carrying portion of the trailer.

Like numerals designate corresponding parts throughout the several figures of the drawings.

Referring to the drawings, 5 designates supporting ground wheels upon which the body 6 is mounted through the medium of an axle 7. The particular construction and divisional arrangement of the living space within the body 6 is immaterial. In the particular form which I have chosen for purposes of explanation side standards 8 support a top or roof 9. The sides may be composed of upper panels 10 which are hinged at 11 so that they may be swung upwardly and one or more lower panels 12 which may be swung downwardly on hinges 13 to constitute a table.

The space within the body of the trailer is divided by a horizontal, preferably plywood, floor 14. The space above floor 14 may be divided into a forward storage space 15 and a rearward, mattress receiving, space, which, when supplied with a mattress 16 provides a full width bed, having sufficient headroom thereabove for a person to sit upright.

The storage space 17 above the floor and forwardly of the mattress may receive an ice box, stove, cooking utensils and other paraphernalia used by campers. The space below floor 14 constitutes a boat receiving compartment 18 into which a boat 19 may be drawn by a winch 20, that is located at the forward end of the trailer. Slats or rails 21 carry rollers 22. L-shaped angle rails 23 carried by the boat 19 ride upon the rollers. A cable 24 attached to the bow of the boat passes over an idler pulley 25 and is then attached to the drum 26 of a conventional winch or windlass 20. The shaft of the drum is provided with a squared end 28 for the reception of a conventional crank handle (not shown) by which the drum may be turned. If desired, the winch may be provided with a conventional pawl and ratchet mechanism 29 for holding the drum of the winch against reverse movement until the pawl is disengaged. A subfloor 30 beneath the boat prevents the boat from being damaged by stones or road grime, oil, tar or the like.

It is to be noted that the center of the boat is so placed with respect to axle 7 that the boat is balanced above the axle. This arrangement of a slidingly mounted boat upon a two wheeled vehicle has the two-fold advantage of so balancing the boat that the strength of one man is sufficient to tip the structure and that the rear end of the trailer and boat are caused to project so far rearwardly of the wheels that when the trailer is backed to the water's edge the rear end of the boat will so overlie the water that when the rear end of the trailer is tipped downwardly and the pawl is released the boat will roll gravitationally down the runway provided by the rails and rollers and be launched directly into a sufficient depth of water to float it, with very little effort upon the part of the user of the boat.

In like manner in loading the boat into the trailer the trailer is backed to the water's edge, the cable of the winch is attached to the bow of the boat and the boat is drawn by the action of the winch, over the rollers, to the position shown in Fig. 1. When drawn inwardly to the position shown in Fig. 1, the boat will be so balanced that the user can easily pull the front end of the trailer downwardly to engage its conventional hitch 31 with the hitch elements (not shown) of a towing vehicle, such as an automobile.

The invention is not limited to any specific division of the trailer body space nor to any specific way of mounting the boat for easy movement into the body of the trailer. As far as I am aware I am the first to provide a boat receiving compartment within the body of and below the floor of a trailer in such manner that the boat and its contents, if any, will be housed and protected from wind, rain, snow or the like. Thus I am able to use the boat to receive supplies, guns, tents, bedding or anything else and have these things protected from theft and from rain, snow, etc.

I may, if desired, make floor 14 in sections so that by lifting one or more of said sections access may be had to articles stored in the boat without unloading said boat.

Therefore it is to be understood that the invention is not limited to the precise construction set forth but that it includes within its purview whatever changes fairly come within either the terms or the spirit of the appended claim.

Having described my invention what I claim is:

In a structure of the character described the combination with a roofed body and a pair of ground wheels upon which the body is mounted in substantially balanced position, a horizontal floor dividing the interior of the body into an upper part and a lower part, the lower part being dimensioned to constitute a boat receiving compartment, a boat adapted to be drawn into said compartment and so dimensioned that when drawn thereinto it lies in balanced relation upon the said two wheels, side panels constituting closures for the space within the upper portion of said body and mounted to swing downwardly and additional panels adapted to constitute closures for the space within the upper portion of the body which are hinged adjacent the roof to be swung upwardly to constitute canopies and power means for drawing the boat into the boat receiving compartment.

DEMPSEY C. BRITTON.

REFERENCES CITED

The following references are of record in the file of this patent:

UNITED STATES PATENTS

| Number | Name | Date |
|---|---|---|
| 1,999,056 | Patton | Apr. 23, 1935 |
| 2,301,639 | Onstott | Nov. 10, 1942 |
| 2,329,419 | Reed | Sept. 14, 1943 |
| 2,389,338 | Zorc, Jr. | Nov. 20, 1945 |

FOREIGN PATENTS

| Number | Country | Date |
|---|---|---|
| 19,438 | Great Britain | Aug. 31, 1911 |
| 193,696 | Great Britain | Mar. 1, 1923 |